United States Patent [19]
Duffy

[11] Patent Number: 6,025,019
[45] Date of Patent: Feb. 15, 2000

[54] USE OF BLOWING AGENT IN MANUFACTURE OF ARTICLE WITH RETENTION ELEMENT

[75] Inventor: Richard J. Duffy, Shelby Township, Mich.

[73] Assignee: Nylok Fastener Corporation, MaComb, Mich.

[21] Appl. No.: 09/264,452

[22] Filed: Mar. 8, 1999

Related U.S. Application Data

[63] Continuation-in-part of application No. 09/118,055, Jul. 17, 1998, abandoned.

[51] Int. Cl.[7] .................................................. B05D 3/02
[52] U.S. Cl. ....................... 427/195; 411/82.3; 411/258; 411/301
[58] Field of Search .......................... 427/195; 411/82.3, 411/258, 301

[56] References Cited

U.S. PATENT DOCUMENTS

| 5,047,439 | 9/1991 | Sano et al. | 427/195 |
| 5,262,197 | 11/1993 | Pollizzi | 427/195 |

*Primary Examiner*—Shrive Beck
*Assistant Examiner*—Michael Cleveland
*Attorney, Agent, or Firm*—Niro, Scavone, Haller & Niro

[57] ABSTRACT

An improved article having a retention element applied to a predetermined portion thereof. The retention element is a soft pliable resin based material that has pockets formed in it through the use of a blowing agent that has been added to the material prior to coating and heating.

13 Claims, 1 Drawing Sheet

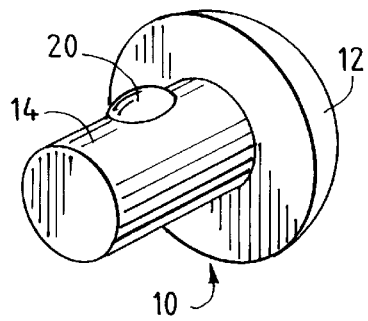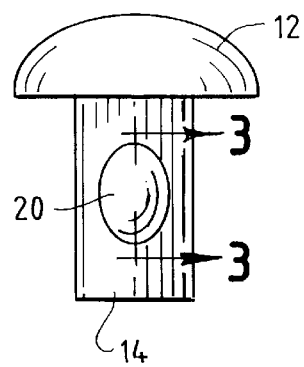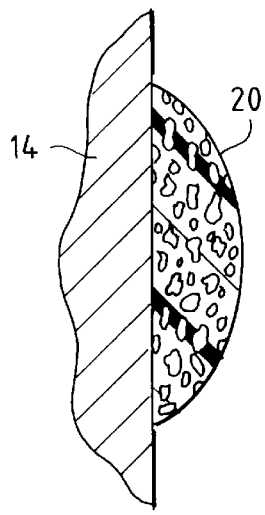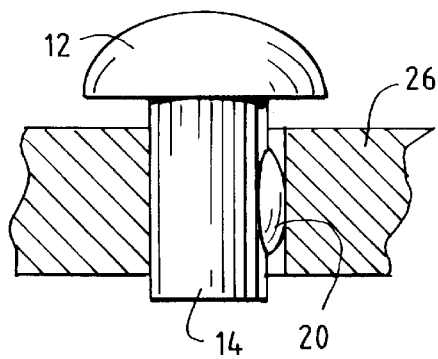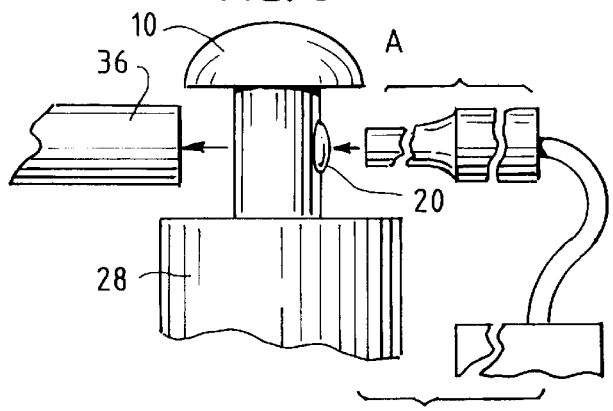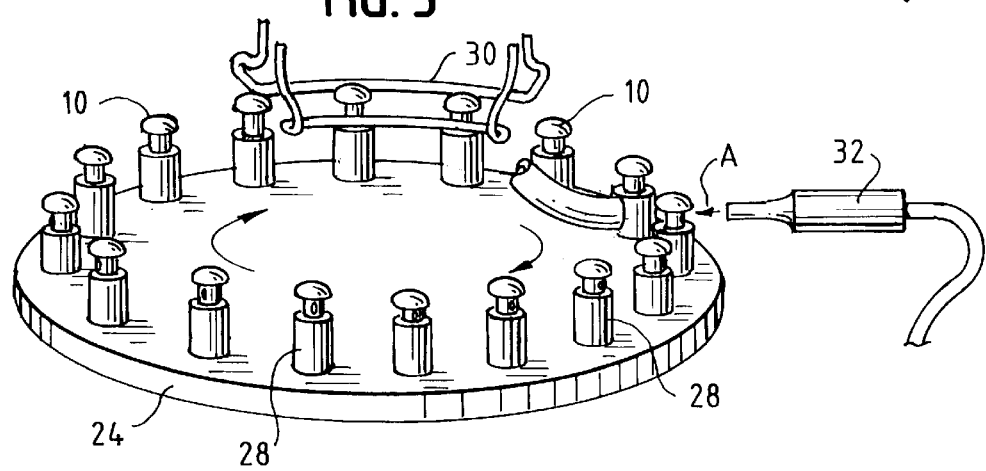

USE OF BLOWING AGENT IN MANUFACTURE OF ARTICLE WITH RETENTION ELEMENT

This application is a continuation-in-part of U.S. patent application Ser. No. 09/118,055 filed Jul. 17, 1998 now abandoned.

BACKGROUND OF THE INVENTION

This invention relates to article retention elements and processes for making the same and is more specifically related to the use of a coating material consisting of a blend of thermoplastic resin and blowing agent to form a retention element on an article. Many resins could be used as an article retention element if the tolerances in the article and its complimentary hole were very small. With larger tolerances, however, the thickness of the retention element has to hold in the largest hole. This makes the insertion of the article difficult, if not impossible, in the smallest hole. This invention overcomes this problem.

SUMMARY OF THE INVENTION

The subject invention provides an article retention element that may be applied to a predetermined location on an article of manufacture such as a rivet, nut, bolt and/or other threaded fastener to retain the article in a predetermined position, usually within a hole or aperture in an associated workpiece or carrier member. The retention element is comprised of a thermoplastic resin blended with a blowing agent. Moreover, the degree of pliability of the retention element and overall volume and size of the retention element may be controlled by variation of the concentration of the blowing agent used in the blend and the heat applied to the article.

In its preferred form, the article retention element is comprised of a blend of powdered resin and blowing agent. The retention element may be formed directly on an article of manufacture by a spray coating process or other known application methods for applying powders to an article. Heat is applied to decompose the blowing agent and to melt the resin. The resulting decomposition of the blowing agent into a gaseous state creates gas pockets within the resin which, in turn, increases the overall height and volume of the element. Once the melted resin cools, the pockets formed in the resin by the blowing agent are maintained within the solidified resin. In addition, as the volume of pockets formed in the resin is increased by increasing the concentration of blowing agent used in the blend, the pliability of the element is increased as well. Moreover, raising the temperature enhances the element's pliability and size by increasing the size of the gas pockets.

It is, therefore, an object and feature of the present invention to provide a retention element formed at a predetermined location on an article of manufacture. It is a further object and feature of the invention to provide for an retention element in which the volume, height and pliability of the element may be varied by adjustment of the concentration of blowing agent used in the powder blend and/or temperature applied to the material.

It is an additional object and feature of the invention to provide for a method of making an article of manufacture with an integral retention element applied thereto.

BRIEF DESCRIPTION OF THE DRAWINGS

These and other objects, features and advantages of the invention will be apparent to those of skill in the art by reference to the following description of the preferred embodiments, taken in connection with the accompanying drawings, in which:

FIG. 1 is a perspective view illustrating the retention element of the present invention as applied to the shank of a rivet;

FIG. 2 is a side elevational view of the rivet and retention element shown in FIG. 1;

FIG. 3 is an enlarged cross-sectional view taken along line 3—3 of FIG. 2;

FIG. 4 is a side view, in partial cross-section, showing the use of the rivet and retention element in a typical application; and FIGS. 5 and 6 are perspective and side views, respectively, showing a typical manufacturing process for fabrication of the rivet and retention element shown in FIG. 1.

DETAILED DESCRIPTION OF THE PREFERRED EMBODIMENTS

An article of manufacture, such as a rivet, nut, bolt or other threaded fastener, having a unique and advantageous retention element may be made in accordance with the present invention. In FIG. 1, the article of manufacture is shown for illustrative purposes as a rivet 10, which includes a head 12 and a shank 14. As may be appreciated and mentioned above, the article of manufacture 10 may also be any type of threaded fastener including male and female threaded fasteners.

In the preferred embodiment of the subject invention, an article retention element 20 is applied to a predetermined portion of rivet shank 14. The retention element 20 comprises a soft, pliable material such as a thermoplastic resin of the olefin or polyolefin type and a blowing agent which has decomposed to form gas pockets in the resin. A finely powdered olefin or polyolefin based material with a specific gravity of between about 0.90 and 1.2 and a melting point of about 90° C. to about 120° C. (about 194° F. to about 248° F.) designated by the trademark Corvell®, part number DG-6004, manufactured by Morton International Specialty Chemicals Group of Reading, Penn., has been shown to be a suitable starting resin for use in accordance with the present invention.

In addition, such a resin and method for applying the same to a threaded fastener to form a sealing coating is disclosed in U.S. Pat. No. 5,141,375 which is hereby incorporated by reference. Moreover, it has been found that the base resin used may generally be an ethylene/acrylic acid copolymer powder having a melting point of 199° F. and specific gravity of 0.94, and a particle size range of +70 mesh, 0–2% retained, and +325 mesh, 85% minimum retained.

The preferred blowing agent which is blended into the above described powdered resin may be an azodicarbonamide powder having a decomposition temperature of 375° F.–428° F. The concentration of powdered blowing agent blended into the resin powder may be between about 0.5% and 10%, with 1.5% being preferred. As with the base resin, the blowing agent may be obtained from the Morton International Specialty Chemicals Group disclosed above.

As shown in FIG. 4, a rivet 10 may be retained in a predetermined location in a work piece 26 through the use of retention element 20. As shown, when rivet 10 is inserted in work piece 26 the retention element 20 engages the workpiece and is compressed by the engagement. This, in turn, holds rivet 10 in place by a friction press fit. However, because of the element's resilience and pliability, rivet 10 may be removed and reinserted and held in place.

The advantage of the present invention is that a relatively high and/or large retention element may be obtained using relatively little resin and while applying the resin blend from a single spray nozzle at relatively high production rates. For example, production rates in excess of one hundred ten parts per minute have been achieved for the illustrated rivet 10 with a retention element 20 extending radially from the rivet shank more than sixty-five thousandths of an inch. Moreover, the retention element 20 not only protrudes significantly, but the retention element is also relatively soft and pliable. This combination of features allows the retention element to perform satisfactorily even where the tolerances of the rivet and its associated workpiece are large. The height of the retention element accommodates workpieces with relatively large holes, and its softness and pliability accommodates workpieces with relatively small holes.

A process for the manufacture of an article with retention element, such as rivet 10, in accordance with the present invention is illustrated in FIGS. 5 and 6. As there shown, the rivets 10 are carried on a horizontally rotating carousel 24 having a plurality of fixtures 28 with the shank 14 of each rivet exposed. Each rivet, including at least shank 14, is then heated to a temperature above the melting point of the blended article retention material. The fastener is typically heated via induction heating coils 30 to between about 300° F. and about 550° F. and more preferably to between about 450° F. and about 525° F. The blended powdered resin material and blowing agent are sprayed through nozzle 32, directly onto the heated shank 14 as shown at arrows A. In practice, the nozzle has an orifice with the dimensions of approximately 1" long by approximately ⅛" high and the particles are between about 17 microns and about 180 microns in diameter. The mean diameter particle size of the sprayed powder blend being about 104 microns. The material is sprayed onto a predetermined portion of the shank of the rivet at a pressure of approximately 34–45 standard cubic feet per hour (SCFH) by positioning the nozzle to apply the powdered blend to the selected predetermined portion of the article. Once the powdered resin comes into contact with the heated shank, it melts and subsequently bonds to the article. Of course, one of ordinary skill will recognize that in some applications, heat may be applied after application of the powdered resin to the article.

In the preferred embodiment of the invention, a vacuum is provided at 36 to remove excess powder blend or overspray. The vacuum is sufficient to draw any excess powder away from the article, thereby avoiding any unwanted application on the article. In the preferred embodiment the exhaust opening 34 is oval in shape and approximately 2" by 1" in size. However, any suitable vacuum exhaust opening can be used. In addition, it may be desirable to provide a secondary air source utilized as an air curtain (not shown) to prevent material from being applied in undesirable locations on the fastener.

Although, the illustrated embodiment shows application of the blended resin and blowing agent through a single nozzle 32, those skilled in the art will appreciate that a plurality of nozzles may be employed. For example, four nozzles have been found suitable for applying the disclosed polyolefin and azodicarbonamide blend to achieve the production rates specified above. Moreover, each fixture 28 on carousel 24 may be designed to rotate 360° during the spraying process to provide uniform distribution of the material completely around the article. Alternatively, each fixture 28 may be fixed to provide a coating on either one or both sides of the fastener. After the material is sprayed onto the heated fastener, a cooling means is required to set the melted material. This cooling is preferably achieved by passing the rivets through a cool air flow or by immersion in a suitable quenching bath. Subsequently, the fastener 10 is removed from fixture 28. If the fixture is a magnet, removal may be accomplished by air blasts or cams. Finally, the fasteners 10 may be deposited into a cooling and rust inhibiting liquid prior to use or packaging for shipment.

The application of heat to the material causes the blowing agent to decompose into a gas. In turn, the gas created by the decomposition expands within the resin, forming gas pockets which force the resin to expand radially outwardly with respect to shank 14. Upon cooling, the gas pockets are retained in place in the resin.

It has also been found that the size and radial height and pliability of the retention element may be controlled and predetermined by varying the concentration of blowing agent used in the blend. As the amount of blowing agent is increased, the height and degree of pliability is increased as well. Moreover, as the temperature used in the process is increased, the size of the pockets or gas bubbles formed in the resin increases. This, too, increases the height, size, and pliability of the element 20.

The surface characteristics of the retention element may also be tailored, at least in part, by control of the time between application of the powder blend to the heated fastener and cooling of the molten resin blend. It has been found desireable to delay the onset of the cooling process long enough to allow the blowing agent to decompose and to allow the hot resin at any "popped" surface bubble to coalesce and form a relatively smooth skin. Typically, this "dwell" time should be at least about 4 to 5 seconds.

While certain features and embodiments of the invention have been disclosed herein, it will be readily understood that the invention includes all modifications and enhancements within the scope and spirit of the following claims.

What is claimed is:

1. A method for the manufacture of an article of manufacture having an outwardly extending article retention element comprising the steps of:

a. holding the article with a predetermined portion exposed for coating;

b. heating at least the portion of the article;

c. applying a powdered material comprised of a resin and blowing agent to the heated portion of the article such that said resin melts and bonds to said portion and said blowing agent converts into a gas which causes said melted resin to expand outwardly away from said portion, thereby forming said retention element; and d. cooling the expanded resin to solidify and fuse the retention element to the article.

2. The method of claim 1, wherein said applying step comprises spraying said material onto the heated portion of the article, and further including the step of providing a negative pressure zone for drawing off excess material.

3. The method of claim 1, wherein the step of heating includes heating at least the portion of the article to a temperature between about 450° F. and about 525° F.

4. The method of claim 1, wherein said material is an olefin based material.

5. The method of claim 1, wherein said material is a polyolefin based material.

6. The method of claim 1, wherein said material is a thermoplastic having a specific gravity of about 0.90 to 1.20.

7. The method of claim 1, wherein said resin includes a powdered polyolefin coating material.

8. The method of claim 1, wherein said blowing agent is a powdered azodicarbonamide material.

9. The method of claim 1, wherein increasing the concentration of the blowing agent increases the volume of said retention element.

10. The method of claim 1, wherein increasing the concentration of the blowing agent increases the pliability of said retention element.

11. The method of claim 1, wherein increasing the temperature to which the article is heated increases the volume of said retention element.

12. The method of claim 1, wherein increasing the temperature to which the article is heated increases the pliability of said retention element.

13. The method of claim 1, wherein the article of manufacture is a fastener having a shank portion and wherein said retention element is applied to and extends outwardly from said shank portion.

* * * * *